(12) United States Patent
Sonoda et al.

(10) Patent No.: US 10,935,939 B2
(45) Date of Patent: Mar. 2, 2021

(54) MACHINE LEARNING DEVICE, SERVO CONTROL APPARATUS, SERVO CONTROL SYSTEM, AND MACHINE LEARNING METHOD

(71) Applicant: FANUC CORPORATION, Yamanashi (JP)

(72) Inventors: Naoto Sonoda, Yamanashi (JP); Satoshi Ikai, Yamanashi (JP); Ryoutarou Tsuneki, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 167 days.

(21) Appl. No.: 15/905,087

(22) Filed: Feb. 26, 2018

(65) Prior Publication Data

US 2018/0284703 A1 Oct. 4, 2018

(30) Foreign Application Priority Data

Mar. 29, 2017 (JP) .............................. JP2017-065050

(51) Int. Cl.
  *G05B 13/02* (2006.01)
  *G05B 6/02* (2006.01)
(52) U.S. Cl.
  CPC .......... *G05B 13/0265* (2013.01); *G05B 6/02* (2013.01); *G05B 2219/33032* (2013.01); *G05B 2219/36411* (2013.01); *G05B 2219/42151* (2013.01)
(58) Field of Classification Search
  None
  See application file for complete search history.

(56) References Cited

U.S. PATENT DOCUMENTS

| | | | |
|---|---|---|---|
| 8,868,221 B1* | 10/2014 | Mealy ................ | G05B 13/027 700/47 |
| 2016/0147201 A1* | 5/2016 | Cmcich-DeWolf ........................ | G05B 13/0265 700/45 |

FOREIGN PATENT DOCUMENTS

| | | |
|---|---|---|
| CN | 102053628 | 5/2011 |
| CN | 103180790 | 6/2013 |
| CN | 103718118 | 4/2014 |
| CN | 103858335 | 6/2014 |
| JP | 04-084303 | 3/1992 |
| JP | 7-210207 | 8/1995 |
| JP | 2010-244256 | 10/2010 |
| WO | 2004/006030 | 1/2004 |

OTHER PUBLICATIONS

Notification of Reasons for Refusal dated Nov. 27, 2018 in corresponding Japanese Application No. JP 2017-065050.
(Continued)

*Primary Examiner* — Sean Shechtman
(74) *Attorney, Agent, or Firm* — Wenderoth, Lind & Ponack, L.L.P.

(57) ABSTRACT

A machine learning device acquires, as a label, a command output by a servo control apparatus to a control target device so as to drive and control the control target device. The machine learning device acquires, as input data, an output of the control target device driven based on the command, and constructs a learning model relating to feedforward control for correcting the command, by performing supervised learning by use of a set of the label and the input data serving as teaching data.

6 Claims, 11 Drawing Sheets

(56) References Cited

OTHER PUBLICATIONS

Office Action dated Jul. 25, 2019 in Chinese Patent Application No. 201810258645.3.
Alrijadjis et al., "Intelligent Self-Tuning PID Controller Using Hybrid Improved Particle Swarm Optimization for Ultrasonic Motor", In: Journal of Theoretical and Applied Information Technology, Aug. 2014, vol. 66 No. 1, pp. 1817-3195.
Office Action dated Aug. 7, 2020 in German Patent Application No. 10 2018 202 654.8.
Alrijadjis et al., "Intelligent Self-Tuning PID Controller Using Hybrid Improved Particle Swarm Optimization for Ultrasonic Motor", In: Journal of Theoretical and Applied Information Technology, Aug. 2014, vol. 66 No. 1, E-ISSN 1817-3195, pp. 1-8.

* cited by examiner

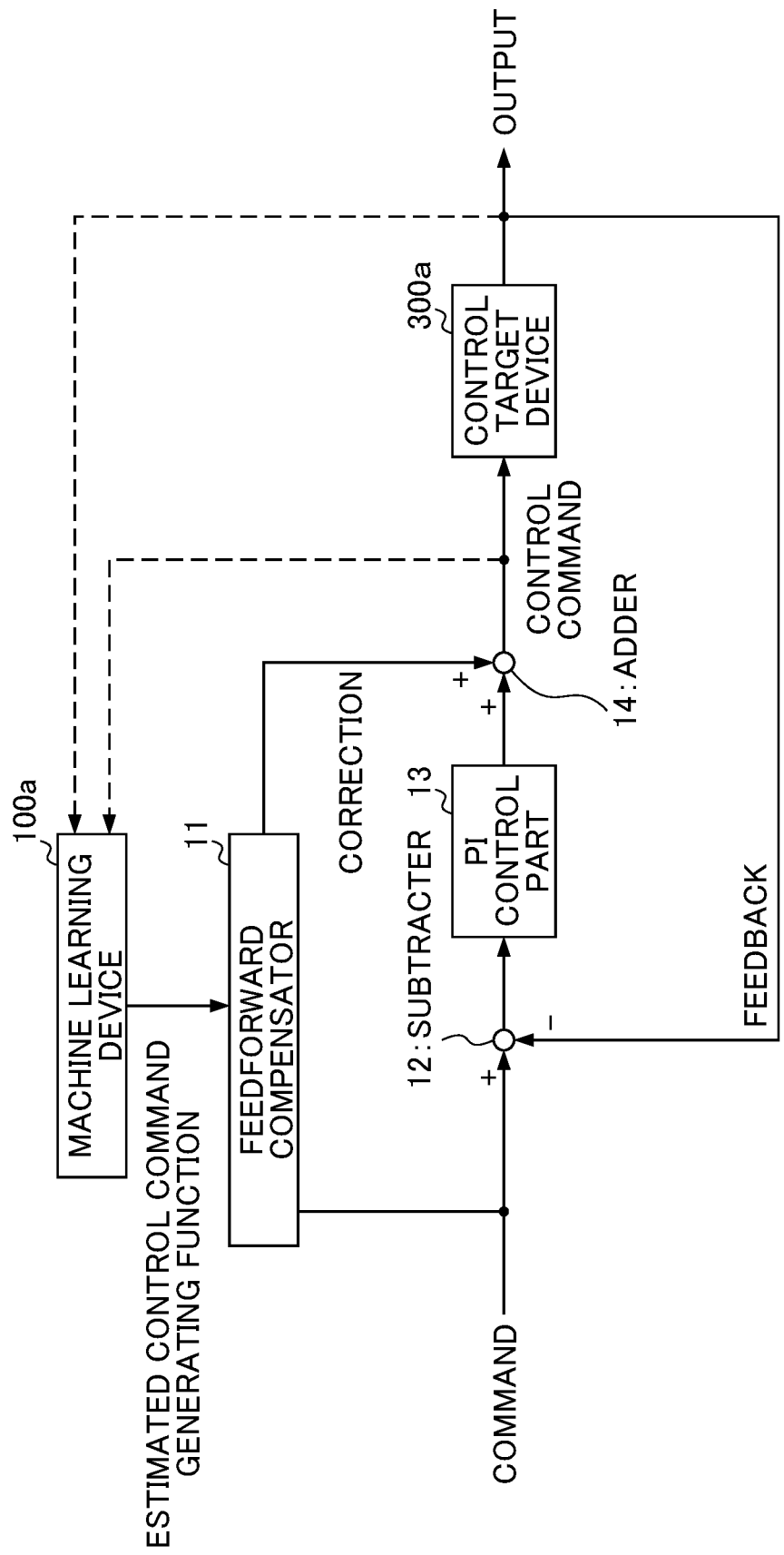

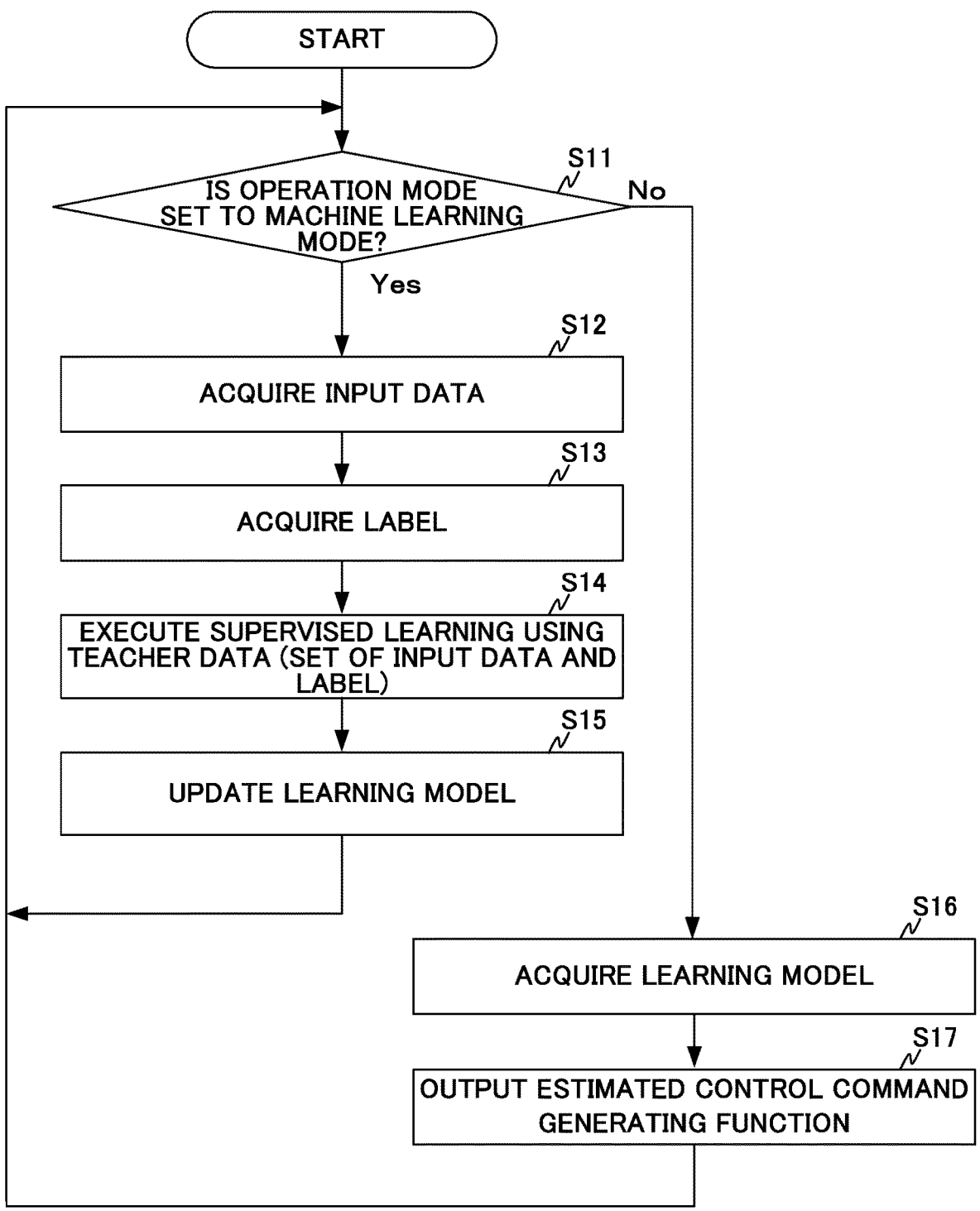

<AT TIME OF FEEDFORWARD CONTROLLING>

MACHINE LEARNING DEVICE, SERVO CONTROL APPARATUS, SERVO CONTROL SYSTEM, AND MACHINE LEARNING METHOD

This application is based on and claims the benefit of priority from Japanese Patent Application No. 2017-065050, filed on 29 Mar. 2017, the content of which is incorporated herein by reference.

BACKGROUND OF THE INVENTION

Field of the Invention

The present invention relates to a machine learning device, a servo control apparatus, a servo control system and a machine learning method for performing machine learning relating to servo control.

Related Art

Conventionally, in a servo control apparatus, a technique of correcting a command by performing feedforward control has been known. Further, a technique of determining parameters of a compensator disposed in a fore stage of a control target by use of machine learning such as a neural network is known. For example, Patent Document 1 discloses a configuration of a servo control apparatus for performing feedback control and feedforward control, by learning a difference between an output of a control target and an output of a linear model through machine learning, and determining, based on the learning result of machine learning, parameters of a compensator disposed in the fore stage of the compensator.

Patent Document 1:
Japanese Unexamined Patent Application, Publication No. H07-210207

SUMMARY OF THE INVENTION

The above-described technique disclosed in Patent Document 1 relates to a configuration for performing reference model adaptive control by use of a linear model as a reference model so as to perform matching with characteristics of the linear model. The linear model is, for example, a model formed in such a manner that a nonlinear control target is subjected to linearization around an equilibrium point. In order to use the technique disclosed in Patent Document 1, a user needs to prepare linear models one by one. However, the preparation of linear models one by one is troublesome for a user, and thus an easier method of performing adjustment relating to feedforward control is desired.

The object of the present invention is to provide a machine learning device, a servo control apparatus, a servo control system and a machine learning method which enable to easily perform adjustment relating to feedforward control and improve command follow-up performance.

(1) A machine learning device according to the present invention (for example, machine learning device 100, which will be described below) includes label acquisition means (for example, label acquisition part 102, which will be described below) for acquiring, as a label, a command output by a servo control apparatus (for example, servo control apparatus 200, which will be described below) to a control target device (for example, control target device 300, which will be described below) so as to drive and control the control target device, input data acquisition means (for example, input data acquisition part 101, which will be described below) for acquiring, as input data, an output of the control target device driven based on the command, and learning means (for example, learning part 103, which will be described below) for building a learning model relating to feedforward control for correcting the command, by performing supervised learning by use of a set of the label and the input data serving as teacher data.

(2) In the machine learning device according to (1), the servo control apparatus may perform feedback control for correcting the command, and the input data acquisition means may acquire feedback in the feedback control as an output of the control target device.

(3) In the machine learning device according to (2), the command may be any one of a position command, a speed command and a current command, or any combination of the position command, the speed command and the current command, and the output of the control target device may be any one of position feedback, speed feedback and current feedback, or any combination of the position feedback, the speed feedback and the current feedback.

(4) In the machine learning device according to any one of (1) to (3), the command acquired by the label acquisition means as a label may include a command scheduled to be output to the control target device.

(5) The machine learning device according to any one of (1) to (4) may further include function output means (for example, estimated control command generating function output part 105, estimated current command generating function output part 106, estimated voltage command generating function output part 107, which will be described below) for generating and outputting a function for generating a correction value in the feedforward control based on the learning model built by the learning means.

(6) A servo control system according to the present invention (for example, servo control system 1, which will be described below) includes the machine learning device according to (5) (for example, machine learning device 100, which will be described below), and the servo control apparatus (for example, servo control apparatus 200, which will be described below) including a feedforward compensator (for example, feedforward compensator 11, feedforward compensator 21 and feedforward compensator 31, which will be described below) for performing feedforward control based on the function output by the function output means.

(7) A servo control apparatus according to the present invention (for example, servo control apparatus 200, which will be described below) includes the machine learning device according to any one of (1) to (4) (for example, machine learning device 100, which will be described below), function output means (for example, estimated control command generating function output part 105, estimated current command generating function output part 106, and estimated voltage command generating function output part 107, which will be described below) for generating and outputting a function for generating a correction value in the feedforward control based on the learning model built by the learning means, and a feedforward compensator (for example, feedforward compensator 11, feedforward compensator 21 and feedforward compensator 31, which will be described below) for performing feedforward control based on the function output by the function output means.

(8) A machine learning method according to the invention, which is executed by a computer (for example, machine learning device 100, which will be described below), includes the steps of label-acquiring, as a label, a command output by a servo control apparatus to a control target device so as to drive and control the control target device, input-data-acquiring, as input data, an output of the control target device driven by the command, and learning-model-building a learning model relating to feedforward control for correcting the command, by performing supervised learning by use of a set of the label and the input data serving as teacher data.

The present invention enables to easily perform adjustment relating to feedforward control and improve command follow-up performance.

BRIEF DESCRIPTION OF THE DRAWINGS

FIG. 2B is a functional block diagram illustrating a configuration at the time of feedforward controlling according to the first embodiment of the present invention.

FIG. 4 is a flowchart illustrating overall basic operations of the embodiment common to respective embodiments of the present invention.

DETAILED DESCRIPTION OF THE INVENTION

Hereinafter, embodiments according to the present invention will be described in detail with reference to the drawings. It is noted that, in the descriptions below about three embodiments, the assumed overall configurations thereof are common to one another, and the overall configuration common to respective embodiments is described first.

Figure 1:
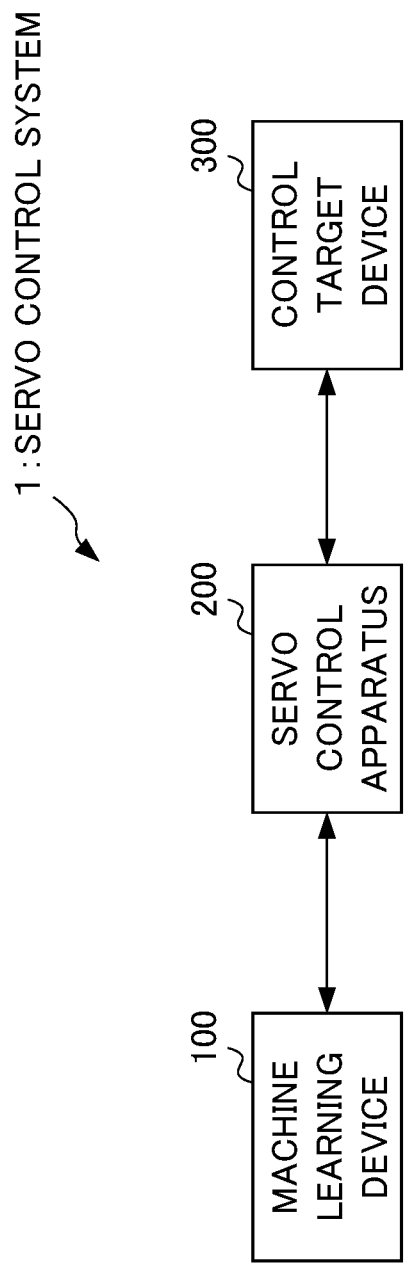
FIG. 1 is a functional block diagram illustrating an overall basic configuration of an embodiment common to respective embodiments of the present invention.

Overall configuration common to respective embodiments FIG. 1 is a functional block diagram illustrating an overall configuration common to respective embodiments. As shown in FIG. 1, a servo control system 1 serving as each embodiment is configured to include a machine learning device 100, a servo control apparatus 200, and a control target device 300.

The machine learning device 100 is a device for performing machine learning to perform adjustment relating to feedforward control by the servo control apparatus 200. The machine learning device 100 can be realized by a personal computer, a server device, CNC (Computerized Numerical Control) or the like.

The servo control apparatus 200 is a device for performing feedforward control by use of a learning model built by the machine learning device 100 and controlling driving of the control target device 300 by performing the feedback control.

The control target device 300, which is a device driven under the control by the servo control apparatus 200, can be realized by, for example, a servo motor, or a machine tool, a robot, an industrial machine or the like including a servo motor. The above-described servo control apparatus 200 may be realized as a single device, or may be realized as a part of such a machine tool, a robot, an industrial machine or the like.

The machine learning device 100 and the servo control apparatus 200 are communicably connected to each other. The servo control apparatus 200 and the control target device 300 are also communicably connected to each other. Such communication can be realized by, for example, LAN (Local Area Network) built in a factory, and may be of any one of wired communication, wireless communication and the combination thereof. The communication standard and the like are not particularly limited. Such communication may be performed via a network (not shown) such as the Internet or a public telephone network. In this case, respective devices may be set adjacently to each other (for example, in one factory), or may be set separately in distant places. Although each figure illustrates a single device for each type of these devices, there is no limitation on the number of each type of these devices. In addition, the connection thereof may be of one-to-many or many-to-many connection, not only one-to-one connection.

First Embodiment

Figure 2A:
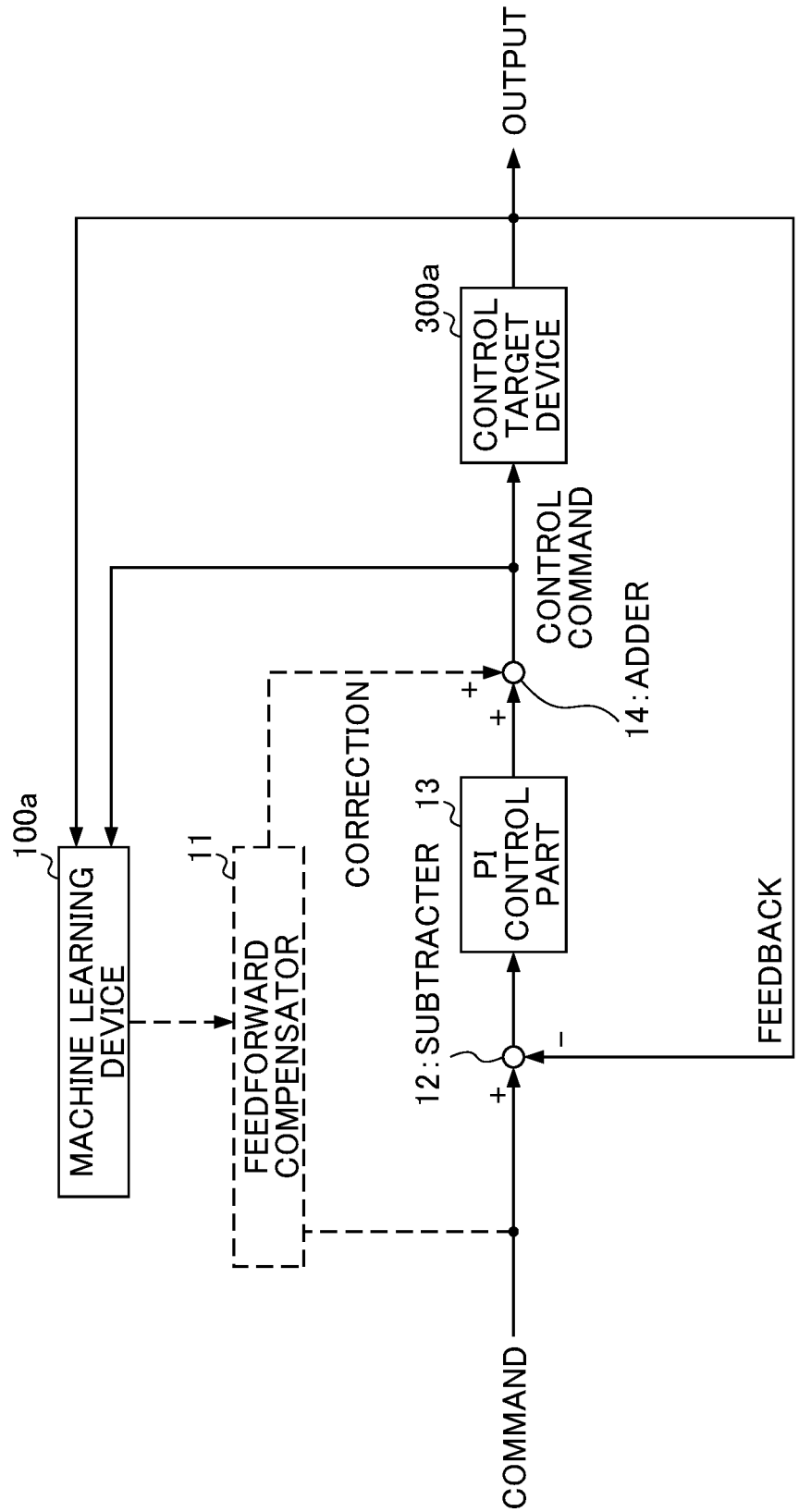
FIG. 2A is a functional block diagram illustrating a configuration at the time of machine learning according to a first embodiment of the present invention.

Next, the configuration according to the first embodiment is described with reference to FIG. 2A and FIG. 2B. In respective embodiments including the present embodiment, the portions to be operated at "the time of machine learning" and at "the time of feedforward controlling" are different. FIG. 2A is a diagram corresponding to "the time of machine learning," while FIG. 2B is a diagram corresponding to "the time of feedforward controlling."

As shown in FIG. 2A and FIG. 2B, the present embodiment is configured to include a machine learning device 100a, a feedforward compensator 11, a subtracter 12, a PI control part 13, an adder 14, and the control target device 300a. The feedforward compensator 11, the subtracter 12, the PI control part 13 and the adder 14 are the components of a servo control apparatus 200a. In the present embodiment, as the feedback control, PI control including proportional operation additionally with integral operation is performed. It is noted that the operation itself of the servo control apparatus for performing the PI control is well known to those skilled in the art, and thus the detailed description concerning this is omitted.

In respective embodiments including the present embodiment, the feedforward control is not performed at the time of machine learning. Therefore, in FIG. 2A, the feedforward compensator 11 for performing the feedforward control and the signal lines connected to the feedforward compensator 11 are represented by broken lines in the sense that they are not functional. Meanwhile, at the time of feedforward controlling, machine learning is not performed. Therefore, in FIG. 2B, the signal lines through which signals for the machine learning are transmitted to the machine learning device 100a are represented by broken lines in the sense that they are not functional.

Next, a description with reference to FIG. 2A is given of a signal flow at the time of machine learning in the present embodiment. First, a command for controlling driving of the control target device 300a is input from a host device (e.g. numerical control device) (not shown) to the servo control apparatus 200a. The input command is subjected to subtraction by the subtracter 12 by use of the feedback, and the deviation between the command as a target value and the feedback as an output value is input to the PI control part 13. It is noted that since the feedforward compensator 11 is not functional at the time of machine learning as described above, the description concerning the command being branched and input also to the feedforward compensator 11 is omitted.

The PI control part 13 generates a control command from the input deviation by use of the transfer function expressed as "K1/s+K2," wherein an integral gain is K1 and a proportional gain is K2, and outputs the generated control command to the control target device 300a. It is noted that, as described above, since the feedforward compensator 11 is not functional at the time of machine learning, the control command is not subjected to correction by the adder 14.

The control command output by the PI control part 13 is input to the control target device 300a. Then, the control target device 300a operates based on the input control command. However, deviation occurs between the command as a target value and an output value due to the influence of the load for driving the control target device 300a, disturbance and the like. Therefore, the output of the control target device 300a driven on the basis of the control command is output to the subtracter 12 as feedback. Then, the feedback control is repeated so that the deviation is reduced based on the feedback. The flow of the feedback control in the servo control apparatus 200a has been described so far.

In parallel with the feedback control, the control command output by the PI control part 13 is branched and input also to the machine learning device 100a. The output of the control target device 300a driven on the basis of the control command is also output to the machine learning device 100a. Then, the machine learning device 100a performs the machine learning based on these two inputs. In order to describe the contents of the machine learning, a description with reference to FIG. 3 is first given of the functional blocks included in the machine learning device 100a.

Figure 3:
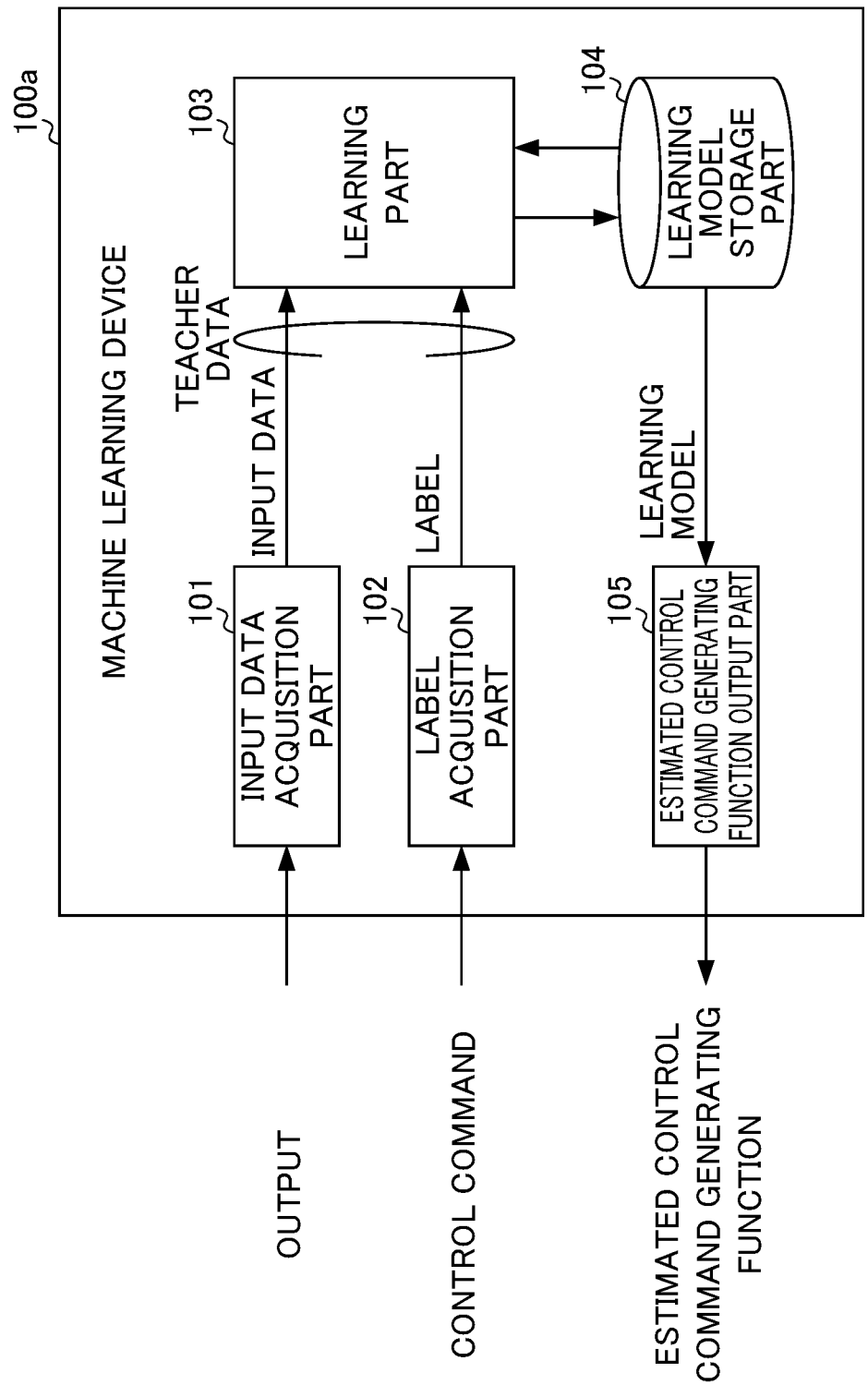
FIG. 3 is a functional block diagram illustrating a configuration of a machine learning device according to the first embodiment of the present invention.

As shown in FIG. 3, the machine learning device 100a is configured to include an input data acquisition part 101, a label acquisition part 102, a learning part 103, a learning model storage part 104, and an estimated control command generating function output part 105.

The input data acquisition part 101 is a part for acquiring as input data (also referred to as a feature amount) the output of the control target device 300a driven on the basis of the control command, and outputting the acquired input data to the learning part 103. The label acquisition part 102 is a part for acquiring as a label the control command output by the PI control part 13, and outputting the acquired label to the learning part 103.

Thereafter, the output as input data and the control command as a label are made as a set and input to the learning part 103. The set including input data and a label corresponds to teacher data in the machine learning.

The learning part 103 builds a learning model by performing the machine learning called supervised learning on the basis of the teacher data input as described above. It is noted that since the supervised learning itself is well known to those skilled in the art, the detailed description thereof is omitted and the outline thereof is described.

In an example, the supervised learning is performed by a neural network configured in a combination with perceptron. Specifically, the set of input data and a label included in the teacher data is provided to the neural network, and learning is repeated while changing weighting for each perceptron so as to match the output of the neural network to the label. In an example, a weighting value is adjusted so as to reduce an error in the output of each perceptron by repeating the processing of performing forward-propagation and then performing back-propagation (also referred to as a method of backwards propagation of errors). In such a way, through learning of characteristics of the teacher data, a learning model for estimating a result from the input is acquired recursively.

The above supervised learning is to eliminate an error between a label and output data while changing weighting values as described above. The label in the present embodiment is the control command given to the control target device 300a, while the input is the output of the control target device 300a. Ideally, the learning model built when the learning part 103 repeats learning corresponds to an inverse function for matching the input value of the control command given to the control target device 300a to the output value of the control target device 300a.

It is noted that the neural network to be used for learning by the learning part 103 may be of a three-layer type, or may be of a further layered type. The learning may be performed through so-called deep learning. The learning model built by the learning part 103 is output to a learning model storage part 104.

The learning model storage part 104 is a storage part for storing the learning model built and output to the learning model storage part 104 by the learning part 103. The estimated control command generating function output part 105 acquires the learning model from the learning model storage part 104 at the time of feedforward controlling. The estimated control command generating function output part 105 generates an estimated control command generating function which is a function for approximating the output to the label on the basis of the acquired learning model, and outputs the generated estimated control command generating function to the feedforward compensator 11. The estimated control command generating function is used by the feedforward compensator 11 at the time of feedforward controlling described below.

The functional blocks of the machine learning device 100a have been described so far. In order to realize these functional blocks, the machine learning device 100a includes an arithmetic processing unit such as CPU (Central Processing Unit). The machine learning device 100a further includes an auxiliary storage device such as HDD (Hard Disk Drive) for storing various control programs, and a main storage device such as RAM (Random Access Memory) for storing data temporarily required when the arithmetic processing device executes a program.

Then, in the machine learning device 100a, the arithmetic processing device reads an application and an OS from the auxiliary storage device, and develops the read application and OS in the main storage device to perform arithmetic processing on the basis of the read application and OS. The arithmetic processing device also controls various types of hardware provided in each device based on the arithmetic result. Thereby, the functional blocks of the machine learning device 100a of the present embodiment are realized. That is, the present embodiment can be realized by cooperation of hardware and software.

In a specific example, the machine learning device 100a can be realized by a personal computer, a server device, CNC (Computerized Numerical Control) or the like. The machine learning device 100a involves a large amount of computation associated with the machine learning. Therefore, in an example, GPU (Graphics Processing Units) mounted on a personal computer and a technology called GPGPU (General-Purpose computing on Graphics Processing Units) are preferably used for arithmetic processing associated with the machine learning, whereby enabling to perform high speed processing. Furthermore, in order to perform higher speed processing, a computer cluster may be built by use of a plurality of computers equipped with such GPU, so that the plurality of computers included in the computer cluster performs parallel processing. It is noted that a machine learning device 100b in a second embodiment and a machine learning device 100c in a third embodiment, which will be described below, can also be realized in the same way as the machine learning device 100a in the present embodiment.

Next, a description with reference to FIG. 2B is given of a signal flow at the time of feedforward controlling performed after the machine learning performed as described above. First, in the same way as the time of machine learning, a command for controlling driving of the control target device 300a is input from a host device (e.g. numerical control device) (not shown) to the servo control apparatus 200a. The input command is subjected to subtraction by use of the feedback by the subtracter 12, and the deviation between the command as a target value and the feedback as an output value is input to the PI control part 13. Since the feedforward compensator 11 is functional at the time of feedforward controlling, the input command is branched and input to the feedforward compensator 11.

The feedforward compensator 11 generates a correction value from the input command based on the above-described estimated control command generating function. Then, the generated correction value is output to the adder 14.

As described above, ideally, the estimated control command generating function is an inverse function for equalizing the input value of the control command given to the control target device 300a to the output value of the control target device 300a through the machine learning. Therefore, ideally the command and the output are enabled to be corrected to the same value by use of the correction value.

However, even if the correction is performed by use of the correction value, the command and the output may not be equalized in some cases, since the influence of disturbance or the like occurs in the control target device 300a. Therefore, the present embodiment adopts the feedback control, which has been described with reference to FIG. 2A, for suppressing the influence of disturbance or the like, in addition to the correction by the feedforward compensator 11.

In the present embodiment, such a method enables to make the value of the control command appropriate, whereby enabling to improve command follow-up performance. In this case, a user is easily able to perform adjustment relating to the feedforward control without needing creation of a linear model or the like serving as a reference model. In the above-described embodiment, the PI control is assumed to be performed. Alternatively, for example, PID control in which a differential element is further combined may be performed.

Next, the operations of the machine learning device 100a of the present embodiment are described with reference to the flowchart of FIG. 4. In step S11, the machine learning device 100a determines whether currently the operation mode of the machine learning device 100a is set to a "machine learning mode" or a "feedforward control mode" (which is illustrated as not being set to "machine learning mode," in the flowchart).

In the case where currently the operation mode of the machine learning device 100a is set to the "machine learning mode," Yes is obtained in the determination of step S11, and the processing goes to step S12. While, in the case where currently the operation mode of the machine learning device 100a is not set to the "machine learning mode," No is obtained in the determination of step S11, and the processing goes to step S16. In step S12 and step S13, the input data acquisition part 101 and the label acquisition part 102 of the machine learning device 100a respectively acquire input data and a label. Specific contents of such data are as described above.

In step S14, the learning part 103 of the machine learning device 100a executes the machine learning using the input teacher data. Specific contents of the machine learning using the teacher data are also as described above.

In step S15, the learning part 103 updates the learning model by outputting the built learning model to the learning model storage part 104. Thereafter, the processing returns to step S11.

By repeating the processing from step S11 to step S15 in such a manner, learning is continued. In the case where the operation mode is switched and set to the feedforward control mode in the course of such repetition, No is obtained in the determination of step S11, and the processing goes to step S16. The setting may be switched, for example, by a user, or alternatively may be switched in the case where the error value between the output of the learning model and a label is equal to or less than a predetermined value, or may be set after the machine learning is repeated a predetermined number of times.

In step S16, the estimated control command generating function output part 105 acquires the learning model stored in the learning model storage part 104.

In step S17, the estimated control command generating function output part 105 generates an estimated control command generating function which is a function for approximating the output to a label on the basis of the acquired learning model, and outputs the generated estimated control command generating function to the feedforward compensator 11. The operations of the servo control apparatus 200a including the feedforward compensator 11 at the time of feedforward controlling are as described above. The first embodiment has been described so far. Next, a second embodiment, which is a modification of the above-described first embodiment, is described.

Second Embodiment

Figure 5A:
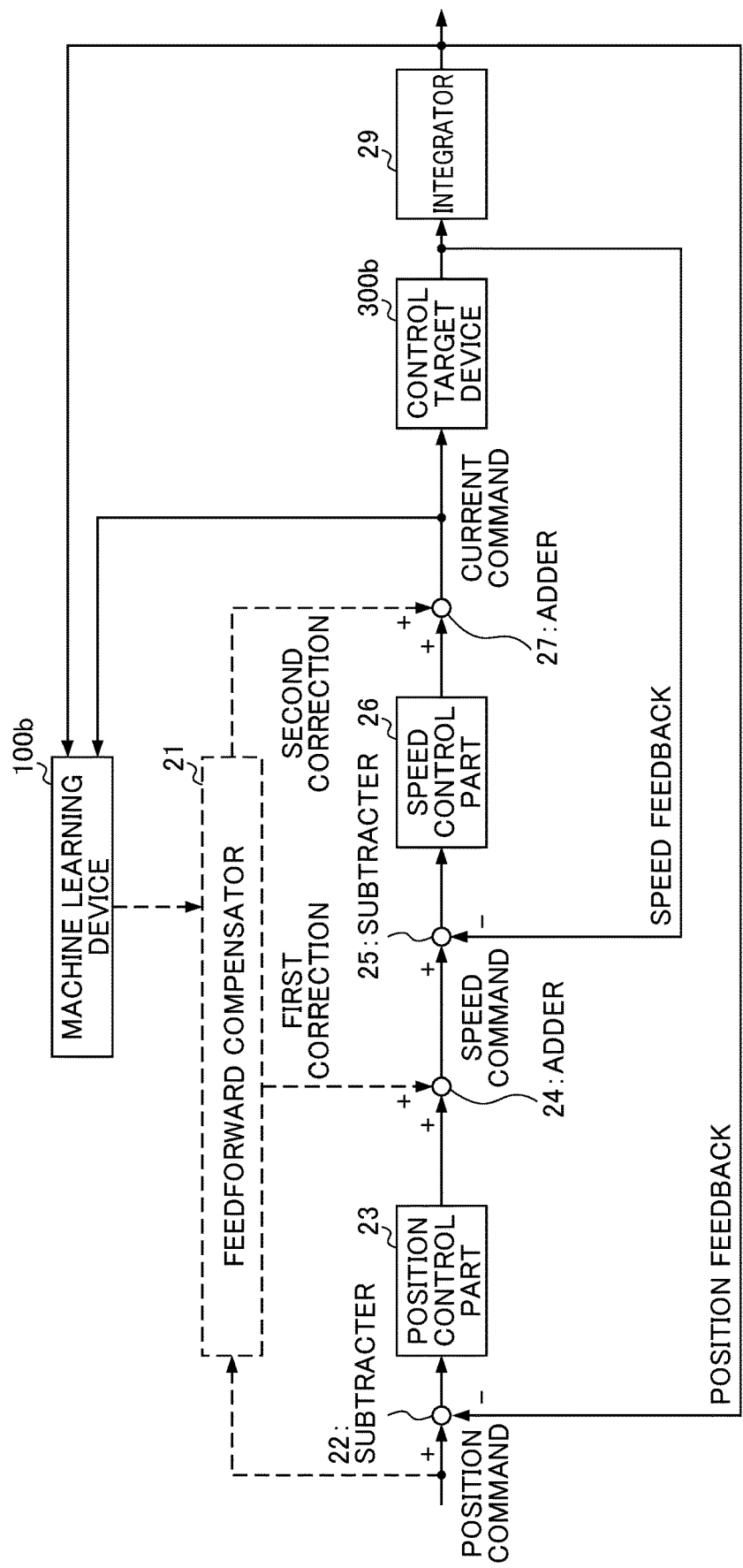
FIG. 5A is a functional block diagram illustrating a configuration at the time of machine learning according to a second embodiment of the present invention.

Next, the configuration according to the second embodiment is described with reference to FIG. 5A and FIG. 5B. FIG. 5A is a diagram corresponding to "the time of machine learning," while FIG. 5B is a diagram corresponding to "the time of feedforward controlling."

It is noted that the basic functions and configuration of the second embodiment are common to those of the first embodiment described above, and thus the duplicate descriptions thereof are omitted hereinafter and different matters between the first embodiment and the second embodiment are described in detail.

Figure 5B:
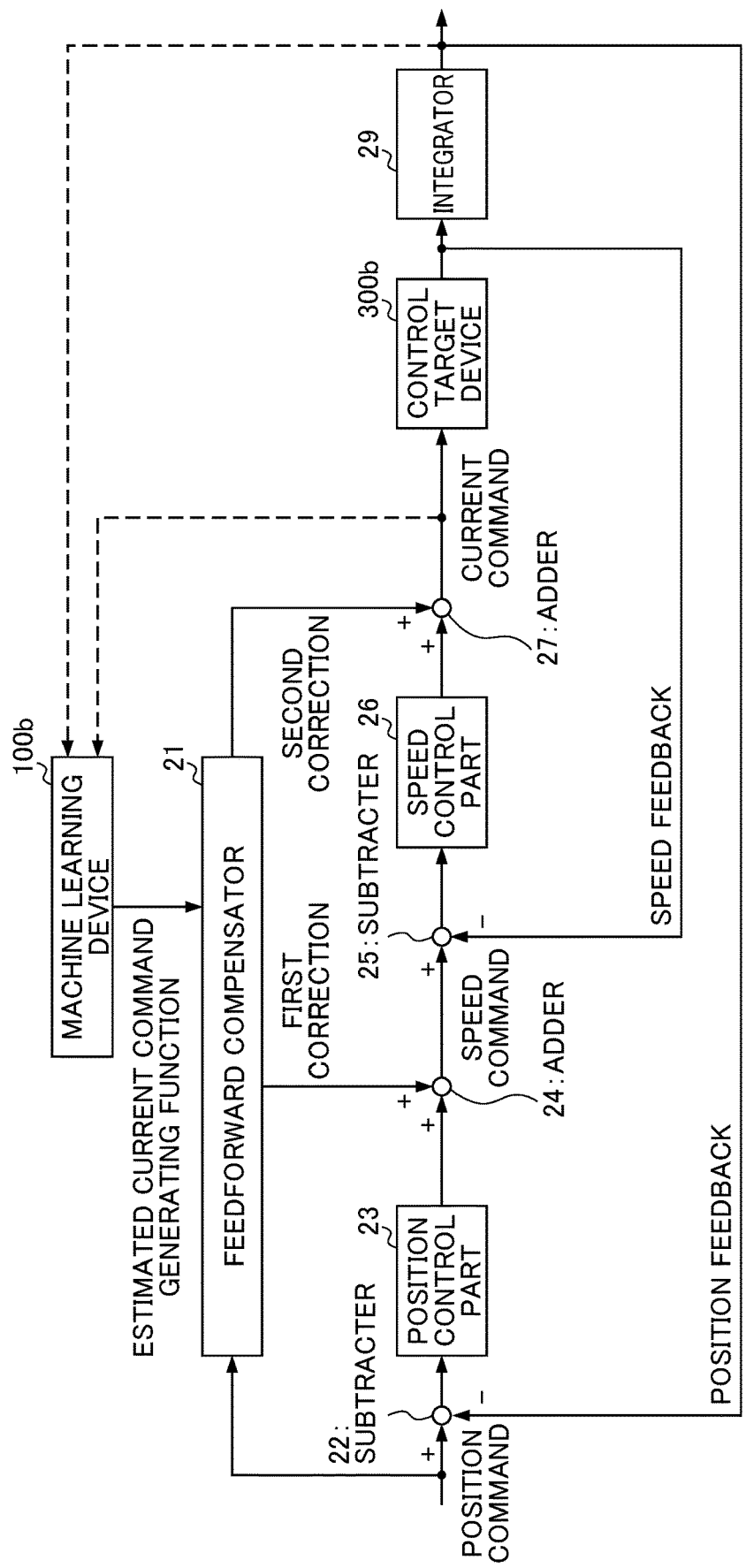
FIG. 5B is a functional block diagram illustrating a configuration at the time of feedforward controlling according to the second embodiment of the present invention.
Figure 6:
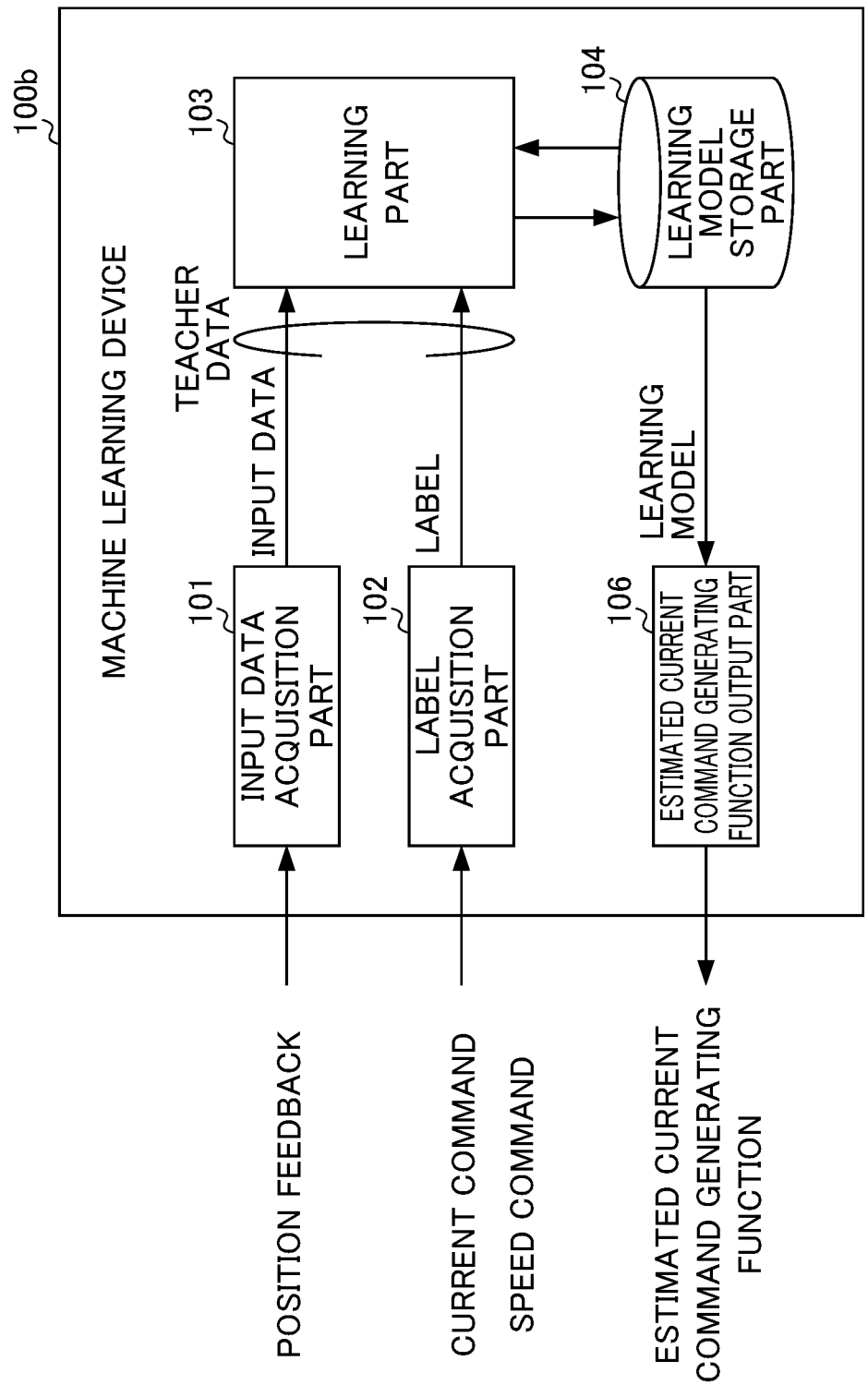
FIG. 6 is a functional block diagram illustrating a configuration of a machine learning device according to the second embodiment of the present invention.

As shown in FIG. 5A and FIG. 5B, the present embodiment is configured to include a machine learning device 100b, a feedforward compensator 21, a subtracter 22, a position control part 23, an adder 24, a subtracter 25, a speed control part 26, an adder 27, a control target device 300b and an integrator 29.

The feedforward compensator 21, the subtracter 22, the position control part 23, the adder 24, the subtracter 25, the speed control part 26, the adder 27, and the integrator 29 are the components of a servo control apparatus 200b. In the present embodiment, speed feedback and the position feedback generated through integration of the speed feedback are performed as the feedback control. It is noted that, as in the case of the servo control apparatus for performing the PI control in the first embodiment, the feedback control itself including the speed feedback and the position feedback is well known to those skilled in the art, and thus the detailed description concerning this is omitted.

Also in the second embodiment, as in the first embodiment, the feedforward control is not performed at the time of machine learning. Therefore, in FIG. 5A, the feedforward compensator 21 for performing the feedforward control and the signal lines connected to the feedforward compensator 21 are represented by broken lines in the sense that they are not functional. Meanwhile, at the time of feedforward controlling, the machine learning is not performed. Therefore, in FIG. 5B, the signal lines through which signals for the machine learning are transmitted to the machine learning device 100b are represented by broken lines in the sense that they are not functional.

Next, a description with reference to FIG. 5A is given of a signal flow at the time of machine learning in the present embodiment. First, a position command for controlling driving of the control target device 300b is input from a host device (e.g. numerical control device) (not shown) to the servo control apparatus 200b. The input position command is subjected to subtraction by use of the position feedback by the subtracter 22, and position deviation, which is the deviation occurring between the position command and the position feedback, is input to the position control part 23.

The position control part 23 processes the position deviation to generate a speed command, and outputs the generated speed command to the speed control part 26. As described above, since the feedforward compensator 21 is not functional at the time of machine learning, the speed command is not subjected to correction by the adder 24.

The speed command output by the position control part 23 is subjected to subtraction by use of the speed feedback by the subtracter 25, and speed deviation, which is the deviation occurring between the speed command and the speed feedback, is input to the speed control part 26.

The speed control part 26 generates a current command by speed loop processing such as proportional calculation and integral calculation based on the speed deviation, and outputs the generated current command to the control target device 300b. It is noted that, as described above, since the feedforward compensator 21 is not functional at the time of machine learning, the current command is not subjected to correction by the adder 27.

The current command output by the speed control part 26 is input to the control target device 300b. Then, the control target device 300b operates based on the input current command. A speed detector is attached to a driving part (servomotor) of the control target device 300b. The speed feedback detected by the speed detector is branched and output respectively to the subtracter 25 and the integrator 29. The subtracter 25 performs subtraction by use of the speed feedback as described above.

The integrator 29 integrates the speed feedback to generate a position feedback, and outputs the generated position feedback to the subtracter 22. The subtracter 22 performs subtraction by use of the position feedback as described above.

As described above, position deviation occurs between the position command as a target value and the position feedback as an output value due to the influence of the load for driving the control target device 300b, disturbance, and the like. Therefore, as described above, the feedback control is repeated so that the position deviation is reduced. The flow of the feedback control in the servo control apparatus 200b has been described so far.

In parallel with the feedback control, the current command output by the speed control part 26 is branched and input also to the machine learning device 100b. The position feedback generated by the integrator 29 through integration of the speed feedback output by the control target device 300b driven on the basis of the control command is also output to the machine learning device 100b. Although signal lines are not shown in the figure, the speed command output by the position control part 23 is branched and input also to the machine learning device 100b.

The machine learning device 100b performs the machine learning based on these inputs. It is noted that the functions themselves in respective functional blocks of the machine learning device 100b are common to those of the machine learning device 100a described above, and thus the duplicate descriptions thereof are omitted.

In the present embodiment, the input data acquisition part 101 acquires as input data (also referred to as a feature amount) the position feedback generated by the integrator 29 through integration. The label acquisition part 102 acquires as labels the current command output by the speed control part 26 and the speed command output by the position control part 23. That is, in the present embodiment, multi-label learning by use of a plurality of labels is performed.

Thereafter, the position feedback as input data and the set of the current command and the speed command as labels are made as a set and input to the learning part 103. The set of the input data and the labels corresponds to teacher data in the machine learning.

The learning part 103 builds a learning model by performing the machine learning called supervised learning on the basis of the teacher data input as described above. The contents of the supervised learning are the same as those described in the first embodiment. It is noted that, in the second embodiment, an estimated current command generating function output part 106, which is used instead of the estimated control command generating function output part 105, outputs an estimated current command generating function based on the learning model. The feedforward compensator 21 in the second embodiment outputs two correction values as first correction and second correction, which will be described below, based on the estimated current command generating function.

Next, a description with reference to FIG. 5B is given of a signal flow at the time of feedforward controlling performed after the machine learning performed as described above. First, in the same way as the time of machine learning, a position command for controlling driving of the control target device 300b is input from a host device (e.g.

numerical control device) (not shown) to the servo control apparatus 200b. Since the feedforward compensator 21 is functional at the time of feedforward controlling, the input position command is branched and input to the feedforward compensator 21. Then, the feedforward compensator 21 generates two correction values from the input command based on the above-described estimated current command generating function. The generated correction values are output to the adder 24 and the adder 27, respectively. The branched position command is subjected to subtraction by the subtracter 22, and input as position deviation to the position control part 23.

The position control part 23 processes the position deviation to generate a speed command, and outputs the generated speed command to the speed control part 26. The speed command output by the position control part 23 is subjected to correction by the adder 24 by use of the first correction (a correction value corresponding to supervised learning with the speed command as a label) output by the feedforward compensator 21 and further subjected to subtraction by use of the speed feedback by the subtracter 25, and then input to the speed control part 26.

The speed control part 26 generates, based on the input, a current command by speed loop processing such as proportional calculation and integral calculation, and outputs the generated current command to the control target device 300b. The current command output by the speed control part 26 is subjected to correction by use of the second correction (a correction value corresponding to supervised learning with the current command as a label) output by the feedforward compensator 21, and output to the control target device 300b. The control target device 300b is driven based on the control command.

Accordingly, the present embodiment adopts the position feedback and the speed feedback, which have been described with reference to FIG. 5A, for suppressing the influence of disturbance or the like, in addition to the two types of correction by the feedforward compensator 21.

Also in the second embodiment as in the above-described first embodiment, such a method enables to make the values of respective commands appropriate, whereby enabling to improve command follow-up performance. In this case, a user is easily able to perform adjustment relating to the feedforward control without needing creation of a linear model or the like serving as a reference model.

It is noted that the operations of the machine learning device 100b in the second embodiment are similar to those of the machine learning device 100a in the first embodiment described with reference to FIG. 4, and thus the duplicate descriptions thereof are omitted. The second embodiment has been described so far. Next, a description is given of a third embodiment, which is a modification of the first embodiment or the second embodiment described above.

Third Embodiment

Figure 7A:
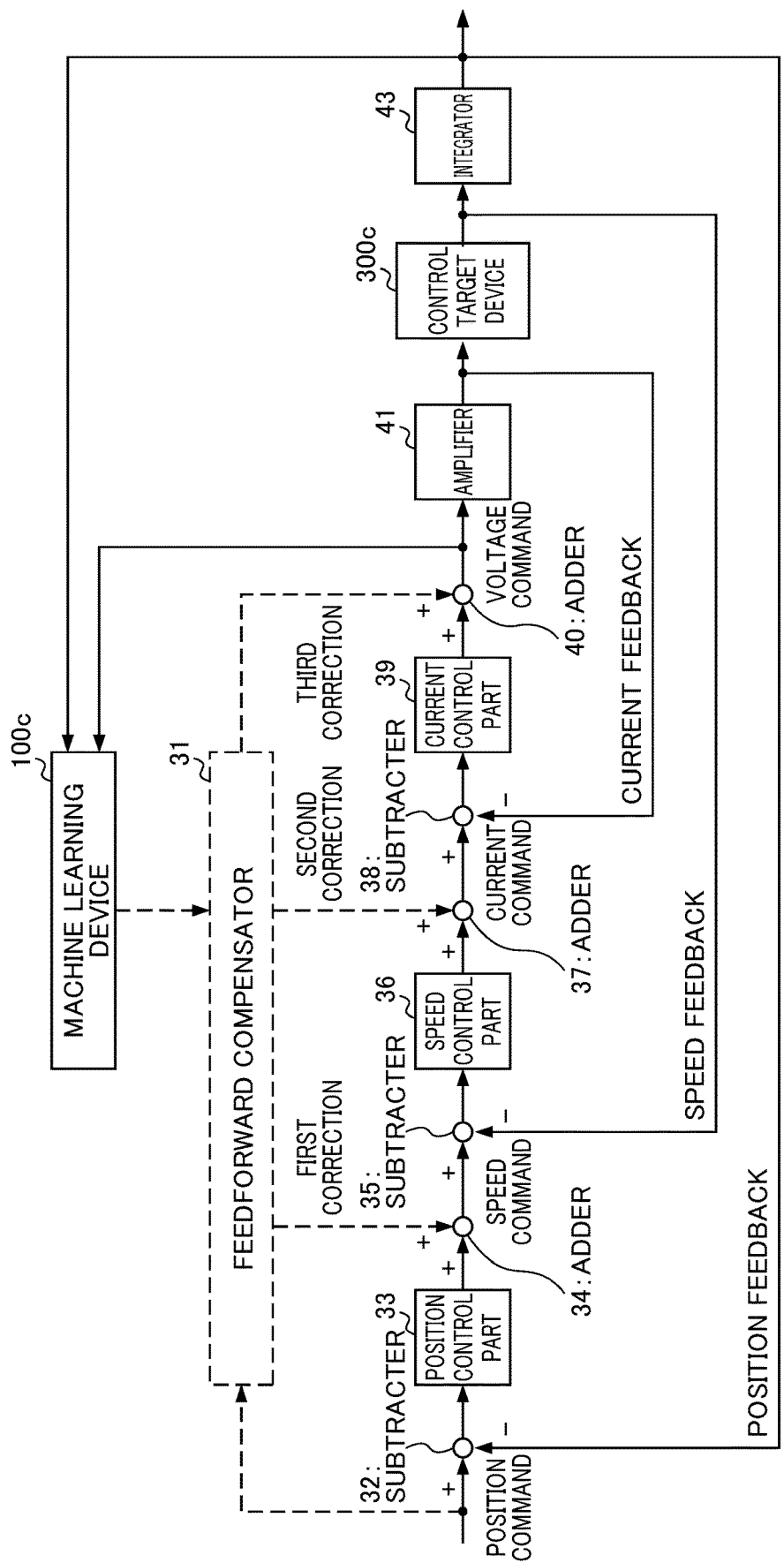
FIG. 7A is a functional block diagram illustrating a configuration at the time of machine learning according to a third embodiment of the present invention.

Next, the configuration according to the third embodiment is described with reference to FIG. 7A and FIG. 7B. FIG. 7A is a diagram corresponding to "the time of machine learning," while FIG. 7B is a diagram corresponding to "the time of feedforward controlling."

It is noted that the basic functions and configuration of the third embodiment are common to those of the first embodiment and the second embodiment described above, and thus the duplicate descriptions thereof are omitted hereinafter and different matters from the first embodiment and the second embodiment are described in detail.

Figure 7B:
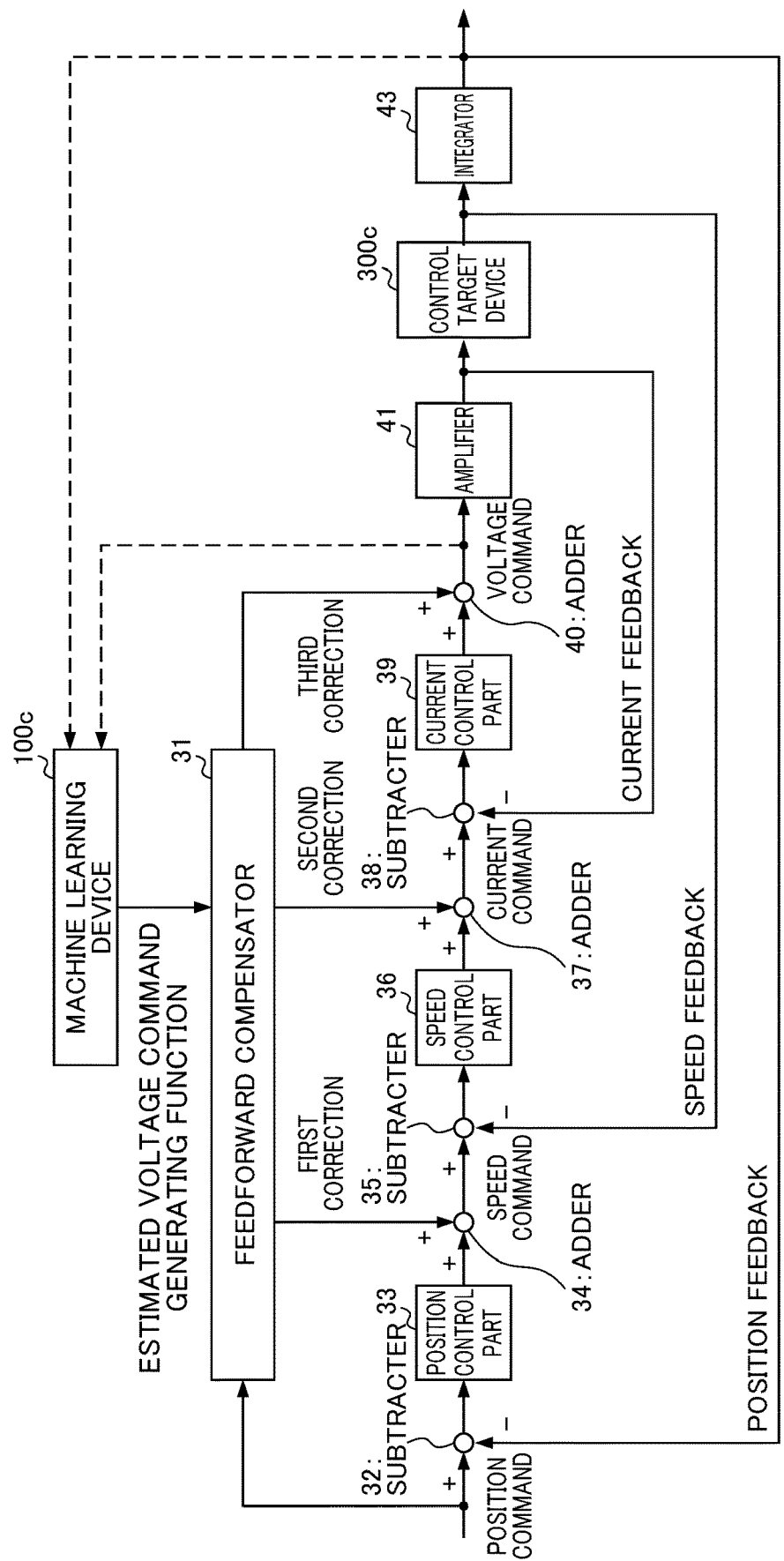
FIG. 7B is a functional block diagram illustrating a configuration at the time of feedforward controlling according to the third embodiment of the present invention.
Figure 8:
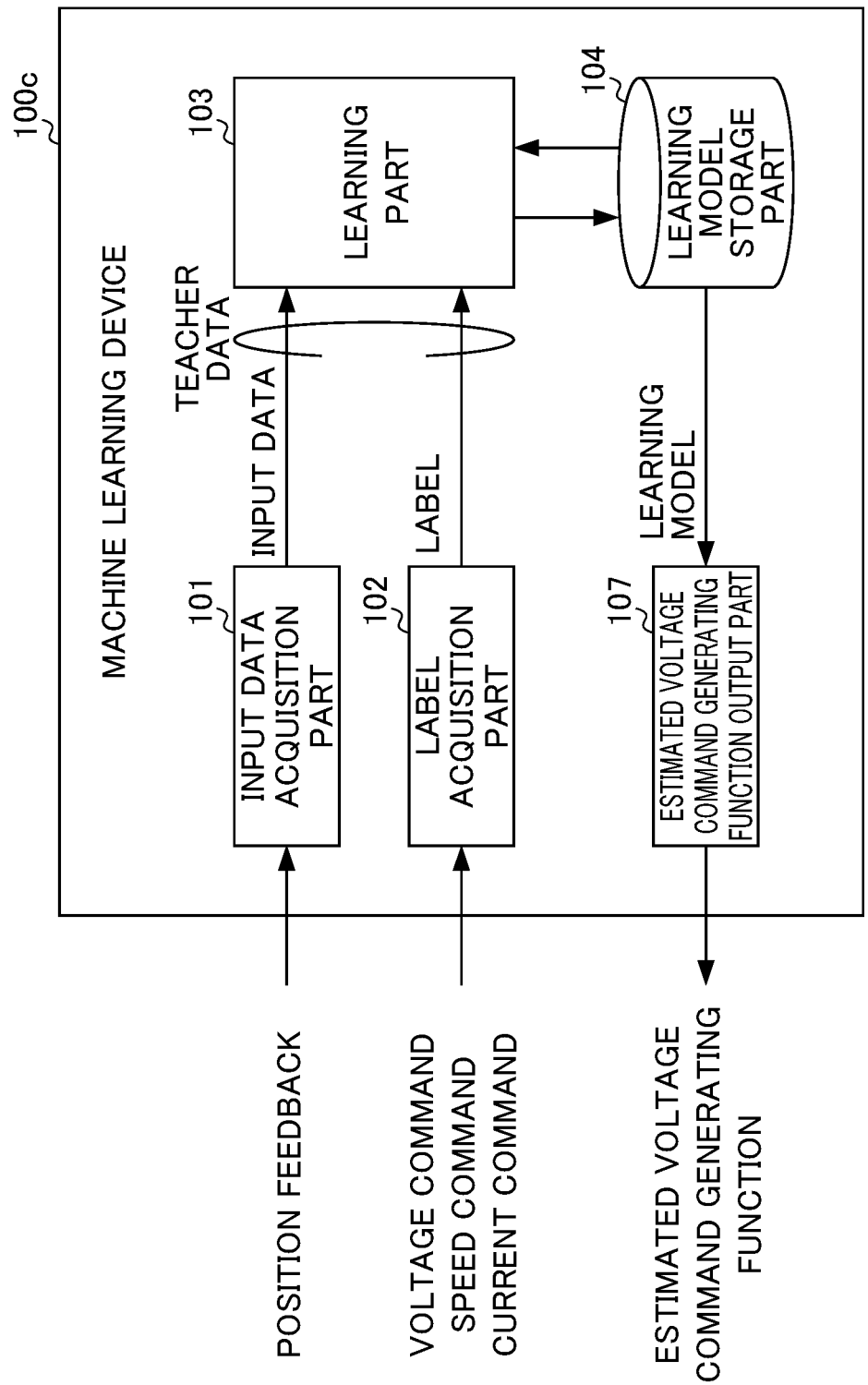
FIG. 8 is a functional block diagram illustrating a configuration of a machine learning device according to the third embodiment of the present invention.

As shown in FIG. 7A and FIG. 7B, the present embodiment is configured to include a machine learning device 100c, a feedforward compensator 31, a subtracter 32, a position control part 33, an adder 34, a subtracter 35, a speed control part 36, an adder 37, a subtracter 38, a current control part 39, an adder 40, an amplifier 41, a control target device 300c and an integrator 43.

The feedforward compensator 31, the subtracter 32, the position control part 33, the adder 34, the subtracter 35, the speed control part 36, the adder 37, the subtracter 38, the current control part 39, the adder 40, the amplifier 41 and the integrator 43 are the components of the servo control apparatus 200c. In the present embodiment, current feedback, speed feedback, and the position feedback generated through integration of the speed feedback are performed as the feedback control. It is noted that, as in the case of the servo control apparatuses respectively in the first embodiment and the second embodiment, the feedback control itself including the current feedback, the speed feedback and the position feedback is well known to those skilled in the art, and thus the detailed description concerning this is omitted.

Also in the third embodiment, as in the first embodiment, the feedforward control is not performed at the time of machine learning. Therefore, in FIG. 7A, the feedforward compensator 31 for performing the feedforward control and the signal lines connected to the feedforward compensator 31 are represented by broken lines in the sense that they are not functional. Meanwhile, at the time of feedforward controlling, the machine learning is not performed. Therefore, in FIG. 7B, the signal lines through which signals for the machine learning are transmitted to the machine learning device 100c are represented by broken lines in the sense that they are not functional.

Next, a description with reference to FIG. 7A is given of a signal flow at the time of machine learning in the present embodiment. First, a position command for controlling driving of the control target device 300c is input from a host device (e.g. numerical control device) (not shown) to the servo control apparatus 200c.

The input position command is subjected to subtraction by use of the position feedback by the subtracter 32, and position deviation, which is the deviation occurring between the position command and the position feedback, is input to the position control part 33.

The position control part 33 processes the position deviation to generate a speed command, and outputs the generated speed command to the speed control part 36. As described above, since the feedforward compensator 31 is not functional at the time of machine learning, the speed command is not subjected to correction by the adder 34. The speed command output by the position control part 33 is subjected to subtraction by use of the speed feedback by the subtracter 35, and speed deviation, which is the deviation occurring between the speed command and the speed feedback, is input to the speed control part 36.

The speed control part 36 generates a current command by speed loop processing such as proportional calculation and integral calculation based on the speed deviation, and outputs the generated current command to the current control part 39. It is noted that, as described above, since the feedforward compensator 31 is not functional at the time of machine learning, the current command is not subjected to correction by the adder 37. The current command output by the speed control part 36 is subjected to subtraction by use of the current feedback by the subtracter 38, and current deviation, which is the deviation occurring between the current command and the current feedback, is input to the current control part 39.

The current control part 39 processes the current deviation to generate a voltage command, and outputs the generated voltage command to the amplifier 41. It is noted that, as described above, since the feedforward compensator 31 is not functional at the time of machine learning, the voltage command is not subjected to correction by the adder 40.

The amplifier 41 generates a driving current for driving the control target device 300c based on the voltage command, and outputs the generated driving current to the control target device 300c. The driving current is input to the control target device 300c. Then, the control target device 300c operates based on the input driving current.

A speed detector is attached to a driving part (servomotor) of the control target device 300c. The speed feedback detected by the speed detector is branched and output to the subtracter 35 and the integrator 43, respectively. The subtracter 35 performs subtraction by use of the speed feedback as described above.

The integrator 43 integrates the speed feedback to generate a position feedback, and outputs the generated position feedback to the subtracter 32. The subtracter 32 performs subtraction by use of the position feedback as described above.

As described above, position deviation occurs between the position command as a target value and the position feedback as an output value due to the influence of the load for driving the control target device 300c, disturbance and the like. Therefore, as described above, the feedback control is repeated so that the position deviation is reduced. The flow of the feedback control in the servo control apparatus 200c has been described so far.

In parallel with the feedback control, the voltage command output by the current control part 39 is branched and input also to the machine learning device 100c. The position feedback generated by the integrator 43 through integration of the speed feedback output by the control target device 300c driven on the basis of the control command is also output to the machine learning device 100c. In addition, although signal lines are not shown in the figures, the speed command output by the position control part 33 is branched and also input to the machine learning device 100c. Similarly, although signal lines are not shown in the figures, the current command output by the speed control part 36 is branched and also input to the machine learning device 100c.

The machine learning device 100c performs the machine learning based on these inputs. It is noted that the functions themselves in respective functional blocks of the machine learning device 100c are common to those of the machine learning device 100a described above, and thus the duplicate descriptions thereof are omitted.

In the present embodiment, the input data acquisition part 101 acquires as input data (also referred to as a feature amount) the position feedback generated by the integrator 43 through integration. The label acquisition part 102 acquires as labels the voltage command output by the current control part 39, the speed command output by the position control part 33, and the current command output by the speed control part 36. That is, in the present embodiment, multi-label learning by use of a plurality of labels is performed.

Thereafter, the position feedback as input data, and the voltage command, the current command and the speed command as labels are made as a set, and input to the learning part 103. The set of the input data and the labels corresponds to teacher data in the machine learning.

The learning part 103 builds a learning model by performing the machine learning called supervised learning on the basis of the teacher data input as described above. The contents of the supervised learning are the same as those described in the first embodiment. It is noted that, in the third embodiment, an estimated voltage command generating function output part 107, which is used instead of the estimated control command generating function output part 105, outputs an estimated voltage command generating function based on the learning model. The feedforward compensator 31 in the third embodiment outputs three correction values as first correction, second correction and third correction, which will be described below, based on the estimated voltage command generating function.

Next, a description with reference to FIG. 7B is given of a signal flow at the time of feedforward controlling performed after the machine learning performed as described above. First, in the same way as the time of machine learning, a position command for controlling driving of the control target device 300c is input from a host device (e.g. numerical control device) (not shown) to the servo control apparatus 200c. At the time of feedforward controlling, since the feedforward compensator 31 is functional, the input position command is branched and input to the feedforward compensator 31. Then, the feedforward compensator 31 generates three correction values from the input command based on the above-described estimated voltage command generating function. The generated correction values are output to the adder 34, the adder 37, and the adder 40, respectively. The branched position command is subjected to subtraction of the position feedback by the subtracter 32 by use of the position feedback, and input to the position control part 33 as position deviation.

The position control part 33 processes the position deviation to generate a speed command, and outputs the generated speed command to the speed control part 36. The speed command output by the position control part 33 is subjected to correction by the adder 34 by use of the first correction (a correction value corresponding to the supervised learning with the speed command as a label) output by the feedforward compensator 31 and further subjected to subtraction by use of the speed feedback by the subtracter 35, and then input to the speed control part 36.

The speed control part 36 generates, based on the input, a current command by speed loop processing such as proportional calculation and integral calculation, and outputs the generated current command to the current control part 39. The current command output by the speed control part 36 is subjected to correction by use of the second correction (a correction value corresponding to the supervised learning with the current command as a label) output by the feedforward compensator 31 and further subjected to subtraction by use of the current feedback by the subtracter 38, and then input to the current control part 39.

The current control part 39 processes the input to generate a voltage command, and outputs the generated voltage command to the amplifier 41. The voltage command output by the current control part 39 is subjected to correction by use of the third correction (a correction value corresponding to the supervised learning with the voltage command as a label) output by the feedforward compensator 31, and input to the amplifier 41.

The amplifier 41 generates, based on the voltage command, a driving current for driving the control target device 300c, and outputs the generated driving current to the control target device 300c. The driving current is input to the control target device 300c. Then, the control target device 300c operates based on the input driving current.

Accordingly, the present embodiment adopts the position feedback, the speed feedback and the current feedback, which have been described with reference to FIG. 7A, for suppressing the influence of disturbance and the like, in addition to the three types of correction by the feedforward compensator 31.

Also in the third embodiment as in the first embodiment and the second embodiment described above, such a method enables to make the values of respective commands appropriate, whereby enabling to improve command follow-up performance. In this case, a user is easily able to perform adjustment relating to the feedforward control without needing creation of a linear model or the like serving as a reference model. It is noted that the operations of the machine learning device 100c in the third embodiment are similar to those of the machine learning device 100a in the first embodiment described with reference to FIG. 4, and thus the duplicate descriptions thereof are omitted.

Three embodiments according to the present invention have been described so far. Each of the above-described embodiments is a preferred embodiment of the present invention, but the scope of the present invention is not limited only to the above-described respective embodiments. Various modifications are available within the scope without departing from the gist of the present invention. For example, the forms after being modified as described below are available.

Modification in which a Servo Control Apparatus Includes a Machine Learning Device In each of the embodiments described above, the machine learning device 100 is configured with a device separate from the servo control apparatus 200. Alternatively, some or all of the functions of the machine learning device 100 may be realized by the servo control apparatus 200.

Freedom in System Configuration

In each of the above-described embodiments, the machine learning device 100 and the servo control apparatus 200 are communicably connected as a one-to-one set. Alternatively, one unit of a machine learning device 100 and a plurality of servo control apparatuses 200, as an example, may be communicably connected directly to each other or via a network so that the machine learning in each of the servo control apparatuses 200 is performed. In this case, a distributed processing system may be adopted, in which respective functions of the machine learning device 100 are distributed to a plurality of servers as appropriate. Alternatively, respective functions of the machine learning device 100 may be realized by use of virtual server functions or the like on a cloud. In the case of a configuration including a plurality of control target devices 300 respectively corresponding to a plurality of servo control apparatuses 200 having the same type name or the same specification or in the same series, the learning results by respective servo control apparatuses 200 may be shared. Such a configuration enables to build a more optimal model.

Online learning, batch learning and mini-batch learning

The above-described supervised learning by the learning part 103 may be performed through online learning, batch learning, or mini-batch learning. The above online learning is a learning method in which supervised learning is instantly performed every time the control target device 300 is driven and teacher data is created. The above batch learning is a learning method in which the control target device 300 is driven, and while teacher data is repeatedly created, a plurality of teacher data corresponding to the repetition are collected, and then supervised learning is performed by use of all of the collected teacher data. The above mini-batch learning is a learning method corresponding to an intermediate learning method between the online learning and the batch learning, in which supervised learning is performed every time teacher data are accumulated to some extent.

Command Scheduled to be Output

In each of the embodiments, a command for controlling driving of the control target device 300 is input from a host device (e.g. numerical control device) (not shown) to the servo control apparatus 200. The command, which is generated on the basis of a processing program or the like embedded in the host device (e.g. numerical control device), is normally output in real time. Alternatively, look-ahead of a processing program enables to look ahead the contents of the command scheduled to be output. Therefore, a command scheduled to be output, that is, a future command may be used as input data in the supervised learning.

Selection of Label and Correction

In each of the second embodiment and the third embodiment described above, the multi-label learning is performed because it is considered efficient. Alternatively, learning with only one label may be performed depending on circumstances in each embodiment. In an example, in the second embodiment, just the current command may be used as a label. Alternatively, in an example, in the third embodiment, just the voltage command may be used as a label. In the second embodiment, as shown in FIG. 5B, the machine learning is performed so that two values as a correction value to the speed command (first correction) and a correction value to the current command (second correction) are output. Alternatively, the machine learning may be performed so that just one of them is output. Similarly, in the third embodiment, as shown in FIG. 7B, the machine learning is performed so that three values as a correction value to the speed command (first correction), a correction value to the current command (second correction), and a correction value to the voltage command (third correction) are output. Alternatively, the machine learning may be performed so that just two or one of them are/is output.

Each of the embodiments described above can be implemented by hardware, software or a combination thereof. Herein, the implementation by software means implementation by a computer that reads and executes a program. When configured with hardware, part or all of the embodiments can be configured with, for example, an integrated circuit (IC) such as LSI (Large Scale Integrated Circuit), ASIC (Application Specific Integrated Circuit), gate array, and FPGA (Field Programmable Gate Array).

In the case in which part or all of the embodiments is configured with a combination of software and hardware, a computer is configured with: a storage unit such as a hard disk and ROM which stores a program describing all or part of the operations of the servo control apparatus illustrated in the flowchart; DRAM which stores data necessary for computation; CPU; and a bus which connects each unit; in which information necessary for computation is stored in the DRAM, and the program is operated in the CPU, whereby all or part of the functions can be realized. A program is stored by using various types of computer-readable media, and can be supplied to a computer. The computer-readable media include various types of tangible storage media. Examples of the computer-readable media include: a magnetic recording medium (e.g. flexible disk, magnetic tape, hard disk drive), a magneto-optical recording medium (e.g.

magneto-optical disk), CD-ROM (Read Only Memory), CD-R, CD-R/W, semiconductor memory (e.g. Mask ROM, PROM (Programmable ROM), EPROM (Erasable PROM), flash ROM, and RAM (random access memory)).

EXPLANATION OF REFERENCE NUMERALS

1 SERVO CONTROL SYSTEM
11, 21, 31 FEEDFORWARD COMPENSATOR
12, 22, 25, 32, 35, 38 SUBTRACTER
13 PI CONTROL PART
14, 24, 27, 34, 37, 40 ADDER
23, 33 POSITION CONTROL PART
26, 36 SPEED CONTROL PART
29, 43 INTEGRATOR
39 CURRENT CONTROL PART
41 AMPLIFIER
100 MACHINE LEARNING DEVICE
101 INPUT DATA ACQUISITION PART
102 LABEL ACQUISITION PART
103 LEARNING PART
104 LEARNING MODEL STORAGE PART
105 ESTIMATED CONTROL COMMAND GENERATING FUNCTION OUTPUT PART
106 ESTIMATED CURRENT COMMAND GENERATING FUNCTION OUTPUT PART
107 ESTIMATED VOLTAGE COMMAND GENERATING FUNCTION OUTPUT PART
200 SERVO CONTROL APPARATUS
300 CONTROL TARGET DEVICE

What is claimed is:

1. A machine learning servo control system comprising:
a control target device;
a servo control apparatus configured to perform feedforward control of the control target device based on a learning model; and
machine learning device configured to construct the learning model, the machine learning device comprising:
a processor; and
a non-transitory memory storing a program, which when executed by the processor causes the machine learning device to operate as:
a label acquisition part for respectively acquiring, as a plurality of labels, a plurality of commands from the servo control apparatus in a first feedback loop for outputting a control command to the control target device, the control command being outputted by the servo control apparatus so as to drive and control the control target device;
an input data acquisition part for acquiring, as input data, an output of the control target device in a second feedback loop different from the first feedback loop, the control target device being driven based on the control command; and
a learning part for building the learning model for feedforward control and respectively correcting the plurality of commands, by performing supervised learning by use of a set of data including the plurality of labels acquired from the servo control apparatus and the input data acquired from the control target device, serving as teaching data,
wherein the plurality of commands are two or more of a position command, a speed command and a current command,
the output of the control target device is any one of position feedback, speed feedback and current feedback, or any combination of the position feedback, the speed feedback and the current feedback,
control of the target control device by the servo control device is based on the learning model and an output received by the machine learning part,
the label acquisition part acquires, as the plurality of labels, the plurality of commands from the servo control apparatus based on a plurality of feedbacks in the first feedback loop, each label being different for each different command acquired,
the input data acquisition part respectively acquires a plurality of feedbacks as a plurality of feedback controls from the output of the control target device in the second feedback loop, and
the machine learning part builds the learning model by performing multi-label learning by using the plurality of labels acquired by the label acquisition part.

2. The machine learning servo control system according to claim 1, wherein
the plurality of commands acquired by the label acquisition part as a plurality of labels include a plurality of commands generated for outputting a control command scheduled to be output to the control target device.

3. The machine learning servo control system according to claim 1, the machine learning device further comprising a function output part for generating and outputting a function for generating a plurality of correction values respectively corresponding to a plurality of commands in the feedforward control based on the learning model built by the learning part.

4. The machine learning servo control system according to claim 3, wherein
the servo control apparatus further comprises a feedforward compensator for performing feedforward control based on the function output by the function output part.

5. The machine learning servo control system according to claim 1, wherein the machine learning device further comprises:
a function output part for generating and outputting a function for generating a plurality of correction values respectively corresponding to a plurality of commands in the feedforward control based on the learning model built by the learning part; and
a feedforward compensator for performing feedforward control based on the function output by the function output part.

6. A machine learning method performed by a machine learning servo control system including a control target device, a servo control apparatus configured to perform feedforward control of the control target device based on a learning model, and a machine learning device configured to construct the learning model, the machine learning device including a processor and a non-transitory memory storing a program, which when executed by the processor causes the machine learning device to perform the machine learning method comprising:
label-acquiring, as a plurality of labels, a plurality of commands respectively from the servo control apparatus in a first feedback loop, the commands being generated for outputting a control command to the control target device, the control command being outputted by the servo control apparatus so as to drive and control the control target device;
input-data-acquiring, as input data, an output of the control target device in a second feedback loop different from the first feedback loop, the control target device being driven by the control command; and learning-model-building the learning model for feedforward control and respectively correcting the plurality of commands, by performing supervised learning by use of a set of data including the plurality of labels acquired from the servo control apparatus and the input data acquired from the control target device, serving as teacher data, wherein the plurality of commands are two or more of a position command, a speed command and a current command, the output of the control target device is any one of position feedback, speed feedback and current feedback, or any combination of the position feedback, the speed feedback and the current feedback, control of the target control device by the servo control device is based on the learning model and an output received from the learning-model-building, in the label-acquiring, as the plurality of labels, the plurality of commands are acquired from the servo control apparatus based on a plurality of feedbacks in the first feedback loop, each label being different for each different command acquired, the input data-acquiring respectively acquires a plurality of feedbacks as a plurality of feedback controls from the output of the control target device in the second feedback loop, and in the learning-model-building, the learning model is built by performing multi-label learning by using the plurality of labels acquired in the label-acquiring.

* * * * *